Aug. 10, 1954  O. E. SEIFERTH  2,686,129
PACKAGE
Filed April 12, 1950
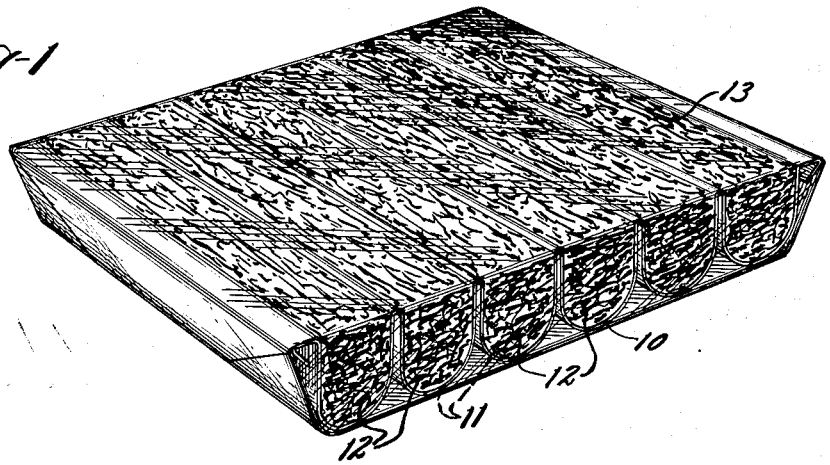
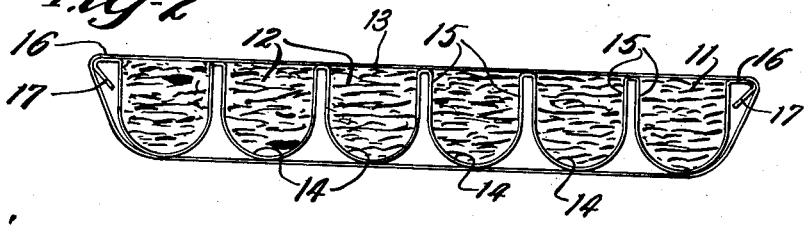
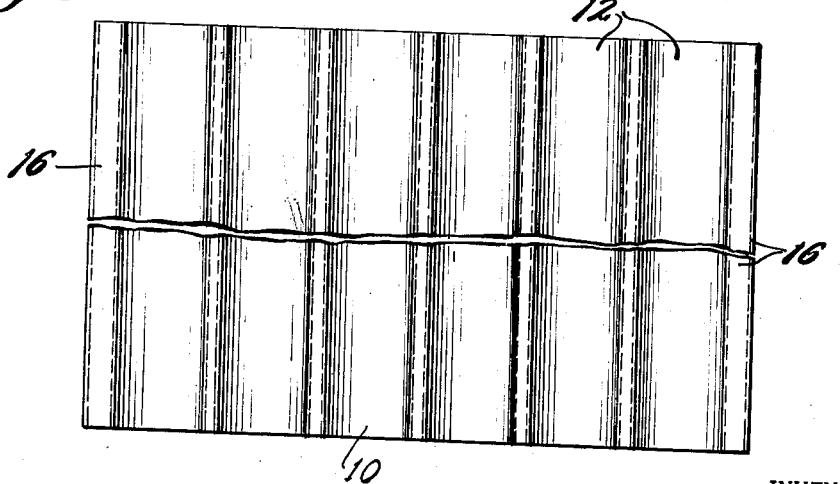
INVENTOR.
Oscar E. Seiferth,
BY
Cromwell, Greist + Warden.
Attys.

UNITED STATES PATENT OFFICE 2,686,129

PACKAGE

Oscar E. Seiferth, Madison, Wis., assignor to Oscar Mayer & Co., Inc., Chicago, Ill., a corporation of Illinois Application April 12, 1950, Serial No. 155,513

7 Claims. (Cl. 99—174)

This invention relates to packaging and is more particularly concerned with the fabrication of a package of material in which the material is placed in a container formed with a plurality of separate material receiving compartments and which is adapted to retain the material in the compartments in a neat and compact manner.

While the invention is applicable to a variety of products, it is particularly adapted for use in connection with packaging of a food product, for example, a meat product such as pork sausage.

The conventional pork sausage package comprises a natural animal casing stuffed with sausage meat and divided into links or separate units of generally uniform size which may be separated into disconnected links or which may be allowed to remain in connected relation. In preparing such a package the natural casings which are generally employed are cleaned and stuffed with the meat product, the latter being extruded under pressure into the casing. A predetermined length of the stuffed casing is then divided into links of generally uniform size which are packed into a shipping container for delivery to the retail store and ultimate sale to the consumer.

It is an object of the present invention to provide an improved package of a food product such as sausage meat for sale to the consumer which is characterized by a tray-like container having formed therein a plurality of compartments which are filled with the product, the container being fabricated of a material which will permit the product to be cooked or processed without removal from the container.

It is a more specific object of the invention to provide a package of a product of the character described which comprises a preformed metallic foil container shaped to provide a plurality of pockets which are filled with the product, the pockets being semi-circular in cross section and of relatively slender elongate form, and the pockets being arranged in side-by-side relation and separated by a reversely folded portion of the metallic foil container.

It is a further object of the invention to provide a method of packaging sausage meat or the like in which a sheet of metallic foil is folded or shaped to provide a tray-like container having a plurality of elongate pockets arranged in side-by-side relation, and in which the pockets are each filled with a quantity of the sausage meat and the filled tray is over-wrapped with a transparent wrapping material.

It is another object of the invention to provide a method of packaging sausage which comprises placing a sheet of metallic foil over a form provided with a series of relatively slender compartment forming recesses arranged in side-by-side relation, folding the material into the recesses, filling the respective pockets so formed with a quantity of the sausage meat, removing the foil from the form and wrapping the same with a transparent wrapping material.

These and other objects of the invention will be apparent from a consideration of the package which is shown by way of illustration in the accompanying drawings, wherein:

Fig. 1 is a perspective view of a package which incorporates therein the principles of the invention;

Fig. 2 is an end elevation of the package; and

Fig. 3 is a top plan view of the package.

Referring now to the drawing, there is illustrated a package which embodies the principal features of the invention and which comprises a compartmented tray-like backing member or container 10 having a predetermined quantity of meat forming an elongate sausage-like unit 11 in each of the compartments 12, the filled container being over-wrapped with a transparent sheet material 13 which completely encloses the same.

The backing member 10 is preferably formed from a relatively stiff metallic sheet material, such as aluminum foil or the like. The member 10 is shaped to provide a plurality of upwardly opening elongate pocket forming recesses or compartments 12 which are open at both ends. The walls forming each of the pockets 12 are generally U-shaped in cross section with a curved bottom portion 14 and upwardly extending side wall portions 15. The side wall portions 15 of adjacent compartments 12 are formed by reversely folding connecting portions of the metallic foil. The sheet of foil is bent or folded along its end edge portions, first outwardly at 16, and then downwardly at 17, to provide a stiffened edge which may be grasped in handling the package.

While in the illustrated package the tray member 10 comprises six compartments 12, any other desired number of compartments may be provided. The number shown is designed to accommodate sufficient sausage meat by weight to provide a half-pound package or a half-dozen sausage units 11 of approximately the same size as conventional link sausages.

The tray-like member 10 may be folded or shaped to provide the compartments 12 in any convenient manner as, for example, by shaping on a suitable recessed forming block. The compartments 12 are shaped so that when the sausage meat is placed therein it is formed or molded into a unit having the generally elongate rounded form of the conventional sausage link.

The wrapper 13 may be any suitable transparent material such as Saran, Cellophane, etc. which is relatively flexible and transparent so as to provide a smooth, neat package and permit visual inspection of the product in the compartments 12.

In preparing the package the tray-like member 10 is first shaped to provide the compartments or recesses 12. The latter are filled with the meat to form the sausage units 11 in any desired manner. The filled tray 10 is then completely wrapped in the transparent sheet 13 which may be folded over the bottom or back of the member 10 and secured by a suitable adhesive, heat sealing or the like.

When the package is received by the consumer it may be prepared for cooking by merely removing the transparent over-wrap 13. The tray-like member 10, with the sausage units 11 in the compartments 12 may be placed directly in the cooking vessel. If it is desired to cook less than the full number of sausage units in the package it may be divided by cutting or slitting the foil member 10 with a suitable tool between the wall portions 14 of adjacent sausage units 11. When the package is placed in the cooking vessel the aluminum foil readily transmits heat and assists in the cooking operation by conducting heat around all but the top side of each of the sausage units 11. The fat content is sufficient in the case of sausage meat to lubricate the foil surfaces and upon completion of the cooking operation the sausage units 11 have the same general appearance as conventional link sausages.

While specific materials and details of construction are referred to in describing the illustrated package, it will be understood that other materials and other details of construction may be resorted to within the spirit of the invention.

I claim:

1. A package of a meat product which is characterized by being in the form of a pliable mass, said package comprising a backing member formed from a generally rectangular sheet of relatively stiff metal foil which is shaped to provide a plurality of connected pairs of side wall forming members which extend in generally parallel spaced relation across one dimension of the sheet, the respective wall forming members of each pair of said side wall members being connected along one end by a curved bottom forming wall and being connected along the opposite top edges by relatively narrow strip portions to adjoining wall forming members whereby to form a connected series of spaced individual package molds having a generally U-shaped cross section with an upwardly opening side, a predetermined quantity of the meat product in the pliable state substantially filling each of said individual molds and a thin transparent wrapper associated with said backing member and covering exposed areas of said product.

2. A consumer package of a comminuted food product, characterized by a generally rectangular sheet of relatively stiff but bendable material, which sheet is corrugated in one direction to provide a plurality of laterally separated parallel grooves having open faces and open ends, and which grooves are solidly filled flush with the open faces and open ends thereof with a comminuted food product in a plastic moldable form and a flat cover sheet in flatwise engagement with both the corrugated sheet and the surface of the food product in the corrugations thereof.

3. A consumer package of a comminuted food product which is characterized by being in a plastic state, said package comprising a backing sheet of relatively stiff metallic foil which is shaped to provide a connected series of upwardly opening elongate compartments arranged in parallel relation and extending across one dimension of the backing sheet, said compartments constituting a plurality of connected product molds having the upper open sides thereof in substantially the same plane, a quantity of said comminuted food product substantially filling each of said compartments, with the product assuming the shape of the molds and with exposed portions thereof substantially in the plane of the open sides of said molds, and a relatively thin transparent wrapper covering the exposed portions of the product in said molds.

4. A package of a comminuted food product which is characterized by being in the form of a pliable mass and which is moldable into the shape of the container in which it is placed, said package comprising a sheet of relatively stiff metal foil shaped to provide a container having a plurality of reversely folded wall forming portions defining elongate upwardly opening molding compartments arranged with the wall forming portions extending to the upper edges thereof in spaced generally parallel relation, each of said compartments having an upwardly opening side and open ends, and a predetermined quantity of the comminuted food product in the pliable state substantially filling each compartment whereby to form a plurality of individual elongate molded units of said product, with each of said units having substantially the shape of the compartment in which it is contained and a thin transparent wrapper enclosing said filled container.

5. A method of forming a consumer package of a comminuted food product which is in the plastic state, which method comprises shaping a backing sheet of metallic foil to provide a plurality of upwardly opening elongate mold forming compartments arranged in connected side-by-side relation and extending across one dimension of the backing sheet, said compartments each having a bottom wall which is curved upwardly and merges with vertical side walls, substantially filling each compartment with a quantity of the comminuted food product so that the exposed surfaces of the product in adjoining compartments are in substantially a common plane, and covering the exposed surfaces of the product with a relatively thin transparent outer wrapper.

6. A method of forming a package of a meat product which is characterized by being in the form of a pliable mass, said method comprising shaping a generally rectangular backing sheet of relatively stiff metal foil to provide a plurality of connected pairs of side wall forming members extending in generally parallel spaced relation across one dimension of the sheet, the respective wall forming members of each pair of said side wall members being connected along one edge by a bottom forming wall and being connected along the opposite edges by relatively narrow strip portions to adjoining wall forming members and thereby forming a connected series of spaced open sided individual packaging molds, substantially filling each of said molds with a predetermined quantity of said meat product in the pliable state and enclosing said backing sheet and said meat product in a relatively thin transparent outer wrapper whereby upon removal of said outer wrapper said meat product may be cooked while in said packaging molds.

7. A method of packaging a meat product which is characterized by being in the form of a pliable mass, which method comprises providing a container formed from a sheet of relatively stiff foil which is shaped into a series of laterally spaced reversely folded wall forming portions defining elongate compartments, each of said compartments having a generally U-shaped cross section with an upwardly opening side and open ends and said compartments being arranged in spaced generally parallel relation with relatively narrow strip portions connecting the top edge of each compartment to the adjoining top edge of the next adjacent compartment, filling each compartment with the meat product in the pliable state whereby to form a plurality of individual elongate molded units of said product with each unit having substantially the shape of the compartment in which it is contained and enclosing said filled container in a thin transparent wrapper which is adapted to be removed to permit the container to be placed in a cooking vessel and the product to be cooked in said container.

References Cited in the file of this patent

UNITED STATES PATENTS

| Number | Name | Date |
|---|---|---|
| 472,811 | Pickett et al. | Apr. 12, 1892 |
| 1,680,294 | Holzapfel | Aug. 14, 1928 |
| 1,696,343 | Burdick | Dec. 25, 1928 |
| 1,945,669 | Vogt | Feb. 6, 1934 |
| 1,973,817 | Lang | Sept. 18, 1934 |
| 1,975,031 | Wilkes et al. | Sept. 25, 1934 |
| 2,012,815 | Hodges | Aug. 27, 1935 |
| 2,226,155 | Bjornson | Dec. 24, 1940 |
| 2,470,579 | Rueckert | May 17, 1949 |
| 2,495,435 | Welch | Jan. 24, 1950 |
| 2,506,305 | Maldonado | May 2, 1950 |
| 2,609,301 | Lindsey | Sept. 2, 1952 |

FOREIGN PATENTS

| Number | Country | Date |
|---|---|---|
| 439,603 | Great Britain | Dec. 10, 1935 |

OTHER REFERENCES

"Good Wrapping Materials Not Expensive When Properly Used," reprinted from Locker Operator Magazine, August 1946, pages 1–4, inclusive.

"Modern Packaging," September 1948, article entitled "Penn Fruits."